United States Patent
Schell (10) Patent No.: US 12,286,546 B2
(45) Date of Patent: Apr. 29, 2025

(54) PRE-TREATMENT LIQUID FOR USE IN INK JET PRINTING

(71) Applicant: Canon Production Printing Holding B.V., Venlo (NL)

(72) Inventor: Jeroen A. Schell, Venlo (NL)

(73) Assignee: CANON PRODUCTION PRINTING HOLDING B.V., Venlo (NL)

( * ) Notice: Subject to any disclaimer, the term of this patent is extended or adjusted under 35 U.S.C. 154(b) by 712 days.

(21) Appl. No.: 17/539,467

(22) Filed: Dec. 1, 2021

(65) Prior Publication Data

US 2022/0186061 A1    Jun. 16, 2022

(30) Foreign Application Priority Data

Dec. 14, 2020   (EP) .................................. 20213916

(51) Int. Cl.
| | | |
|---|---|---|
| C09D 11/00 | (2014.01) | |
| C09D 11/033 | (2014.01) | |
| C09D 11/38 | (2014.01) | |
| C09D 11/54 | (2014.01) | |

(52) U.S. Cl.
CPC ............ C09D 11/54 (2013.01); C09D 11/033 (2013.01); C09D 11/38 (2013.01)

(58) Field of Classification Search
CPC ........ C09D 11/54; C09D 11/033; C09D 11/38
USPC ........................................... 106/31.01, 31.13
See application file for complete search history.

(56) References Cited

U.S. PATENT DOCUMENTS

| | | |
|---|---|---|
| 6,419,352 B1 | 7/2002 | Kubota et al. |
| 6,786,588 B2 | 9/2004 | Koyano et al. |
| 8,523,342 B2 | 9/2013 | Takaori et al. |
| 8,591,018 B2 | 11/2013 | Goto et al. |
| 2011/0303113 A1 | 12/2011 | Sarkisian et al. |
| 2012/0019588 A1 | 1/2012 | Mubarekyan |
| 2012/0098883 A1 | 4/2012 | Matsuyama et al. |
| 2012/0229558 A1 | 9/2012 | Nishizaki et al. |
| 2012/0314000 A1 | 12/2012 | Sarkisian et al. |
| 2014/0055520 A1 | 2/2014 | Inumaru et al. |

FOREIGN PATENT DOCUMENTS

| | | | |
|---|---|---|---|
| EP | 0 761 783 A2 | 3/1997 | |
| EP | 0 959 112 A1 | 11/1999 | |
| EP | 1103584 A2 * | 5/2001 | ............. C09D 11/38 |
| EP | 2 489 707 A1 | 6/2012 | |
| EP | 3 647 485 A1 | 5/2020 | |
| JP | 2014-97632 A | 5/2014 | |
| WO | WO 01/94688 A1 | 12/2001 | |

(Continued)

OTHER PUBLICATIONS

European Search Report issued in Application Number EP 20 21 3916 dated May 4, 2021.

*Primary Examiner* — James E McDonough
(74) *Attorney, Agent, or Firm* — Birch, Stewart, Kolasch & Birch, LLP (57) ABSTRACT

An aqueous pre-treatment liquid for use in ink jet printing includes water and magnesium-disulfamate. Such pre-treatment composition is non-yellowing and crystal-free and shows good jetting properties. These properties are retained even when a solid co-solvent is added to the composition for anti-curl improvement, thereby enabling to provide non-yellowing pre-treatment liquids with good jetting properties and anti-curl behavior.

5 Claims, 1 Drawing Sheet

A  B  C
D  E  F
G  H  I (56) References Cited

FOREIGN PATENT DOCUMENTS

| WO | WO 01/96653 A1 | 12/2001 |
| WO | WO 2011/099977 A1 | 8/2011 |
| WO | WO 2014/051547 A1 | 4/2014 |

* cited by examiner

PRE-TREATMENT LIQUID FOR USE IN INK JET PRINTING

FIELD OF THE INVENTION

The present invention relates to an aqueous pre-treatment liquid for use in ink jet printing, in particular an aqueous pre-treatment liquid that is suitable to be applied onto a recording substrate by means of an ink-jet imaging device.

BACKGROUND ART

In the field of ink jet printing, pre-treatment liquids are used for improving print quality. The pre-treatment liquid comprises a component that reacts with a component in the ink, e.g. the colloidal stability of dispersed pigment particles (present in the ink) is imparted by a metal salt (present in the pre-treatment liquid). Therefore, upon contact between the ink composition and the pre-treatment liquid, the dispersed pigment particles destabilize, agglomerate and are pinned to the surface of the recording substrate. Therefore, (inter) color bleeding and coalescence on machine coated (MC) papers may be prevented, which is an improvement of the print quality. The OD is increased and show-through is decreased on plain papers.

Pre-treatment liquids are known from the prior art and usually comprise either a strong acidic compound or a (poly)valent metal salt, having the function of a fixer and/or crashing agent.

Pre-treatment liquids, also termed reaction solutions or liquids, primer liquids, processing liquids or ink-receiving solutions, comprising polyvalent metal salts are known from the prior art, in particular from U.S. Pat. Nos. 6,419,352; 6,786,588; 8,523,342; 8,591,018; US 2011/0303113; US 2012/0098883; US 2012/0314000; and WO 2014/051547, Published US Patent Application 2012/0019588 discloses fixer fluids, for ink-jet printing comprising a metal carboxylate salt as a fixer agent. In particular calcium acetate, calcium propionate, calcium butyrate, calcium bromide, calcium carbonate, calcium chloride, calcium citrate, calcium cyanamide, calcium phosphate, calcium lactate, calcium nitrate, calcium oxalate and calcium sulfate are disclosed as fixer agents.

Published US Patent Application 2014/0055520 discloses an ink-receiving solution comprising at least one metal salt. In particular calcium chloride JP2014097632 discloses a treatment liquid for treating a recording medium which includes at least a water-soluble organic solvent, an amphiphilic substance, an organic acid or organic acid salt and/or cation polymer, a hydrophobic crosslinking agent, and water. Bisethoxy digiycol succinate, lysine sodium dilauroyl glutamate can are cited as amphiphilic substances.

EP2489707A1 discloses an ink composition comprising cyan or magenta pigment particles and (substantially) water-insoluble resin particles and/or water-insoluble wax particles. An ink set comprising such an ink and a treatment liquid including an aggregating component that forms an aggregate when contacted with the ink composition is also disclosed.

EP0761783A2 discloses an inkjet ink and an inkjet recording method wherein a reaction solution containing a reactant, capable of breaking the state of dispersion and/or dissolution of a pigment in the ink composition when brought into contact with the ink composition.

WO2011/099977A1 discloses a fixer fluid composition for inkjet printing comprising a metal carboxylate salt as fixer agent.

EP0959112A1 discloses a reaction solution that comprises at least e polyvalent metal salt, ammonia, and benzotriazole or a benzotriazole derivative.

US2012/229558A1 discloses a treatment solution for ink-jet recording, comprising; water; and basic amino acid or a salt thereof which is contained in the treatment solution in an amount of not less than 1% by weight. Disclosed examples of basic amino acids are lysine, arginine, histidine and ornithine.

US2012/0098883 discloses an aqueous primer (pre-treatment liquid) containing Magnesium-sulfate. Magnesium-sulfate provides a non-yellowing pre-treatment liquid, which is in view of ink jet printing a preferred pre-treatment solution.

Magnesium-sulfate is a non-toxic salt with the benefits of non-yellowing (like Magnesium/Calcium-nitrate salts) and less smell (like Magnesium/Calcium-acetate or Magnesium/Calcium-propionate salts).

It is a disadvantage of a pre-treatment liquid comprising Magnesium-sulfate as crashing agent, that Magnesium-sulfate has the tendency to crystallize in the primer solution, in particular at higher concentrations. Higher concentrations of the crashing salt are desired for being able to provide a right amount of crashing agent to the surface of the print substrate with a minimum amount of liquids (e.g.) water, such that application of thin films of pre-treatment liquid is enabled. Crystallization of the crashing agent in the pre-treatment liquid may impair the jettability of the pre-treatment solution due to the presence of crystals that may form obstructions in the jetting path of an imaging device.

It is therefore an object of the present invention to provide a pre-treatment liquid that provides non-yellowing and non-smelling properties, provides good jetting properties and provides anti-curl properties.

SUMMARY OF THE INVENTION

The object is at least partially achieved by providing a pre-treatment liquid according to claim 1.

The pre-treatment liquid according to the present invention comprises sulfamate anions in the crashing agent salt, in particular Magnesium-disulfamate. Sulfamate is the conjugated base of sulfamic acid. The chemical formula of sulfamate is $SO_2(NH_2)$; therefore, Magnesium-disulfamate is $Mg(SO_2(NH_2)O)_2$.

The sulfamic acid salt provides non-yellowing properties for optical brightening agents, in particular for use on plain paper, when compared to conventionally used magnesium-nitrate salts. Magnesium-disulfamate provides non-crystallizing properties to the pre-treatment liquid of the present invention.

In an embodiment, the magnesium-disulphamate is present in a concentration of above 10 wt %, preferably above 20 wt % more preferably above 30 wt % relative to the total pre-treatment liquid composition.

In an embodiment, the aqueous pre-treatment liquid further comprises a solid co-solvent, preferably selected from the group consisting of: β-alanine, xylitol, betaine (trimethylglycine), isosorbide, dimethyl urea (DMU), γ-amino butyric acid and sorbitol, These (solid) co-solvents provide anti-curl properties to the pre-treatment liquid of the present invention without impairing the crystallization properties of it. Therefore, a non-yellowing pre-treatment liquid with good jetting capability (no crystallization) and with anti-curl properties is provided by this embodiment of the present invention.

In an embodiment, the co-solvent is present in an amount of above 10 wt % preferably above 15 wt %, more preferably above 20 wt %, more preferably above 25 wt % relative to the total pre-treatment liquid composition.

BRIEF DESCRIPTION OF THE DRAWINGS

For a more complete understanding of the invention and the advantages thereof, exemplary embodiments of the invention are explained in more detail in the following description with reference to the accompanying drawing figures, in which like reference characters designate like parts and in which.

DETAILED DESCRIPTION

Pre-Treatment Liquid

Pre-treatment liquids according to the present invention comprise a metal sulfamate salt, which is a non-yellowing, non-crystallizing crashing agent. Pre-treatment liquids may comprise additives such as co-solvents, pH-regulators and surfactants. Pre-treatment liquids according to the present invention can be suitably used on plain papers and machine coated (MC) papers, which are well known in the art.

Metal Salts

Metal sulfamate salts that can be suitably used in pre-treatment liquids according to the present invention comprise monovalent metal ions such as $Li^+$, $Na^+$, $K^+$, $Hg^+$, $Cu^+$ and $Ag^+$. However, it is preferred that thin layers of the pre-treatment liquid can be applied to a print substrate, in order to prevent deformation of the print substrate (in particular paper-like substrates). Therefore, in order to provide an effective pre-treatment liquid in thin layers, a salt providing a relatively high ionic strength is preferred.

In the context of the present invention, ionic strength is defined in accordance with equation 1:

$$I = \frac{1}{2} \times \sum_{i=1}^{n} (c_i \times z_i^2) \qquad \text{equation 1}$$

wherein:
I is the ionic strength in M (i.e. mol/l);
$c_i$ is the concentration of ion i;
$z_i$ is the valence of ion i;
For example, the ionic strength of a 0.5 mol/l $Na_2SO_4$ solution is:

$0.5*(2*0.5*(1)^2+1*0.5*(-2)^2)=1.5$ M

Another criterion to be observed is that the solubility of the selected salt is high enough to be able to prepare an effective reaction solution. For these reasons, polyvalent metal ions are preferred, such as: $Ca^{2+}$, $Mg^{2+}$, $Sr^{2+}$, $Zn^{2+}$, $Cu^{2+}$, $Ni^{2+}$, $Fe^{3+}$, $Cr^{3+}$ and $Al^{3+}$. Of these, $Mg^{2+}$ and $Ca^{2+}$ are most preferred for HSE reasons.

In general, the pre-treatment liquids according to the present invention comprise between 10 wt % and 60 wt %, preferably between 15 w % and 50 wt %, more preferably between 20 wt % and 40 wt % of the multi-valent metal sulfamate salt, with reference to the total composition. The amount of salt is however limited to the maximum solubility of the salt. The saturation degree (actual concentration/maximum solubility*100%) of the salt in the pre-treatment liquid is in general between 10% and 100%, preferably between 15% and 95%, more preferably between 20% and 80%.

Co-Solvents

In order to meet jettability requirements, co-solvents may be added to the pre-treatment liquid. Co-solvents may have multiple functions, e.g. adapting the rheological behavior of the pre-treatment liquid and/or preventing drying of the pre-treatment liquid in the imaging device or on the nozzle surface of the imaging device, which drying may lead to precipitation of the metal salt in the imaging device or on the nozzle plate. Co-solvents may also be used to improve penetration of the main solvent (water) into the print substrate, such co-solvents are also termed penetrants. The type of co-solvents used is not limited to any kind, as long as the effect of the present invention is preserved. Co-solvents similarly used in (aqueous) ink compositions may be suitably used in pre-treatment liquids according to the present invention. Examples of suitable co-solvents are water-soluble organic solvents such as polyhydric alcohols, polyhydric alcohol alkyl ethers, polyhydric alcohol aryl ethers, nitrogen-containing heterocyclic compounds, amides, amines, ammonium compounds, sulfur-containing compounds, propylene carbonate, and ethylene carbonate. In an embodiment of the present invention solid co-solvents are used, which are non-migrating components when printed on a substrate, which may hence counteract migrating co-solvents present in an ink composition printed on top of an applied pre-treatment layer. In this way (long term) curl of the printed matter may be prevented or at least mitigated.

Examples of water-soluble organic solvents include (but are not limited to): glycerin (also termed glycerol), propylene glycol, dipropylene glycol, tripropylene glycol, tetrapropylene glycol, polypropylene glycol, ethylene glycol, diethylene glycol, triethylene glycol, tetraethylene glycol, polyethylene glycols preferably having a molecular weight of between 200 gram/mol and 1000 gram/mol (e.g. PEG 200, PEG 400, PEG 600, PEG 800, PEG 1000), glycerol ethoxylate, petaerythritol ethoxylate, polyethylene glycol (di)methylethers preferably having a molecular weight of between 200 gram/mol and 1000 gram/mol, tri-methylolpropane, diglycerol (diglycerin), trimethylglycine (betaine), N-methylmorpholine N-oxide, decaglyserol, 1,4-butanediol, 1,3-butanediol, 1,2,6-hexanetriol, 2-pyrrolidinone, dimethylimidazolidinone, ethylene glycol mono-butyl ether, diethylene glycol monomethyl ether, diethylene glycol monoethyl ether, diethylene glycol mono-propyl ether, diethylene glycol mono-butyl ether, triethylene glycol monomethyl ether, triethylene glycol monoethyl ether, triethylene glycol mono-propyl ether, triethylene glycol mono-butyl ether, tetraethylene glycol monomethyl ether, tetraethylene glycol monoethyl ether, propylene glycol mono-butyl ether, dipropylene glycol monomethyl ether, dipropylene glycol monoethyl ether, dipropylene glycol monopropyl ether, diethylene glycol monobutyl ether, tripropylene glycol monomethyl ether, tripropylene glycol monoethyl ether, tripropylene glycol monopropyl ether, tripropylene glycol monobutyl ether, tetrapropylene glycol monomethyl ether, diethylene glycol diethyl ether, diethylene glycol dibutyl ether, triethylene glycol diethyl ether, triethylene glycol dibutyl ether, dipropylene glycol dibutyl ether, tri propylene glycol dibutyl ether, 3-methyl 2,4-pentanediol, diethylene-glycol-monoethyl ether acetate, 1,2-hexanediol, 1,2-pentanedial and 1,2-butanediol.

Suitable solid co-solvents providing anti-curl properties are, but not limited to: xylitol, betaine (trimethylglycine), isosorbide, dimethyl urea (DMU), sorbitol and adonitol. Examples of other (solid) anti-curl co-solvents are certain amino-acids, for example (but not limited to): β-alanine, proline and γ-amino butyric acid.

In an embodiment, a mixture of the water-soluble organic solvents may be comprised in a pre-treatment liquid according to the present invention. The individual organic solvents preferably being present in an amount of 1 weight % to 40 weight %, more preferably in an amount of 3 weight % to 30 weight %, even more preferably in an amount of 5 weight % to 20 weight %, relative to the total ink composition.

pH-Regulators pH-regulators may be added to the pre-treatment liquid to optimize the pH of the pre-treatment liquid in order to meet the pH requirements specified for the used print head. In general, the pH specification of the print head is in the alkaline region (i.e. pH>7). Therefore, alkaline pH-regulators are preferred. Examples of suitable pH-regulators are (but are not limited to): KOH, ammonia, (secondary and tertiary) amines, amino alcohols, in particular N-alkyl-dialkanolamines. Specific examples of suitable amino alcohols are: triethanolamine, N-metyldiethanolamine, N-ethyldiethanolamine, N-n-butyl-monoethanolamine and N-n-butyldiethanolamine.

Usually pH-regulators are present in a small amount in the pre-treatment liquid, in particular less than 1 wt % with respect to the total pre-treatment liquid composition. However, pH-regulators can be suitably applied in any amount until the desired pH has been reached and as long as the effect of the present invention is preserved Surfactants Surfactants may be added to the pre-treatment liquid to improve the spreading behavior of the pre-treatment liquid on the print substrate. Examples of suitable surfactants are not limited to any kind, as long as the effect of the present invention is preserved. Examples of the surfactant include nonionic surfactants, cationic surfactants, anionic surfactants, amphoteric surfactants, in particular betaine surfactants, silicone surfactants, and fluoro surfactants. Particularly, at least one selected from acetylene surfactants, silicone surfactants and fluoro surfactants.

Examples of a cationic surfactant include: aliphatic amine salts, aliphatic quarternary ammonium salts, benzalkonium salts, benzethonium chloride, pyridinium salts, imidazolinium salts.

Examples of an anionic surfactant include: alkyl sulfates, sodium dodecyl sulfate (SDS), polyoxyethylene alkylether acetic acid salts, dodecylbenzene sulfonic acid salts, lauric acid salts, and salts of polyoxyethylene alkylether sulfate, an aliphatic acid soap, an N-acyl-N-methyl glycin salt, an N-acyl-N-methyl-β-alanine salt, an N-acylglutarnate, an acylated peptide, an alkylsulfonic acid salt, an alkylbezenesulfonic acid salt, an alkylnaphthalenesulfonic acid salt, a dialkylsulfo succinate (e.g. sodium dioctyl sulfosuccinate (DSS); alternative names: docusate sodium, Aerosol OT and AOT), alkylsulfo acetate, α-olefin suifonate, N-acyl-methyl taurine, a sulfonated oil, a higher alcohol sulfate salt, a secondary higher alcohol sulfate salt, an alkyl ether sulfate, a secondary higher alcohol ethoxysulfate, a polyoxyethylene alkylphenyl ether sulfate, a rnonoglysuifate, an aliphatic acid alkylolamido sulfate salt, an alkyl ether phosphate salt and an alkyl phosphate salt.

Examples of an amphoteric surfactant include: a carboxybetaine type, a sulfobetaine type, an aminocarboxylate salt and an imidazolium betaine.

Examples of a nonionic surfactant include: polyoxyethylene alkylether, polyoxypropylene polyoxyethylene alkylether, a polyoxyethylene secondary alcohol ether, a polyoxyethylene alkylphenyl ether, a polyoxyethylene sterol ether, a polyoxyethylenelanolin derivative polyoxyethylene polyoxypropylene alkyl ether, polyoxyethylene alkylester, a polyoxyethyleneglycerine aliphatic acid ester, a polyoxyethylene castor oil, a hydrogenated castor oil, a polyoxyethylene sorbitol aliphatic acid ester, a polyethylene glycols aliphatic acid ester, an aliphatic acid monoglyceride, a polyglycerine aliphatic acid ester, a sorbitan aliphatic acid ester, polyoxyethylene sorbitan aliphatic ester, a propylene glycol aliphatic acid ester, a cane sugar aliphatic acid ester, an aliphatic acid alkanol amide, polyoxyethylene alkylamide, a polyoxyethylene aliphatic acid amide, a polyoxyethylene alkylamine, an alkylamine oxide, an alcoxylated alcohol, an acetyleneglycol, an ethoxylated acetylene glycol, acetylene alcohol.

As the fluoro surfactant, a surfactant having 2 to 16 fluorine-substituted carbon atoms is preferred, and a surfactant having 4 to 16 fluorine-substituted carbon atoms is more preferred. When the number of fluorine-substituted carbon atoms is less than 2, the effect peculiar to a fluoro surfactant may not be obtained. When it is more than 16, degradation in storage stability etc. may arise.

Examples of the fluoro surfactants include nonionic fluoro surfactants anionic fluoro surfactants, and amphoteric fluoro surfactants.

Examples of the nonionic fluoro surfactants include perfluoroalkyl phosphoric acid ester compounds, perfluoroalkyl ethylene oxide adducts, and polyoxyalkylene ether polymer compounds having perfluoroalkyl ether groups as side chains. Among these, polyoxyalkylene ether polymer compounds having perfluoroalkyl ether groups as side chains are preferable because they are low in foaming property.

As the fluoro surfactants, commercially available products may be used. Examples of the commercially available products include SURFLON S-HI, S-HI, S-112, S-113, S-121, S-131, S-132, S-141 and S-145 (all of which are produced by Asahi Glass Co., Ltd.), FLUORAD FC-93, FC-95, FC-98, FC-129, FC-135, FC-170C, FC-430 and FC-431 (all of which are produced by Sumitomo 3M Limited), MEGAFAC F-470, F-1405 and F-474 (all of which are produced by Dainippon Ink Chemical Industries Co., Ltd.), ZONYL TBS, FSP, FSA, FSN-100, FSN, FSO-100, FSO, FS-300 and UR (all of which are produced by E. I. du Pont de Nemours and Company), FT-110, FT-250, FT-251, FT-400S, FT-150 and FT-400SW (all of which are produced by Neos Company Limited), and POLYFOX PF-136A, PF-156A, PF-151N, PF-154, and PF-159 (all of which are produced by OMNOVA Solutions Inc.) Among these, ZONYL FS-300 (produced by E. I. du Pont de Nemours and Company), FT-110, FT-250, FT-251, FT-400S, FT-150, FT-400SW (produced by Neos Company Limited), and POLYFOX PF-151N (produced by OMNOVA Solutions

Inc.) are preferable in that they are excellent in print quality, particularly in color developing ability and in dye-leveling property.

The silicone surfactant is not particularly limited and may be suitably selected in accordance with the intended use.

Examples of the silicone surfactant include side-chain-modified polydimethylsiloxane, both-ends-modified polydimethylsiloxane, one-end-modified polydimethylsiloxane, and side-chain/both-ends-modified polydimethylsiloxane. Polyether-modified silicone surfactants having, as a modified group, a polyoxyethylene group or a polyoxyethylene polyoxypropylene group are particularly preferable because they exhibit excellent physical properties as water-based surfactants.

The silicone surfactant may be suitably synthesized or commercial products may be used. The commercial product is readily available from BYK Chemie GmbH, Shin-Etsu Chemical Co., Ltd., TORAY Dow Corning Silicone Co., Ltd., Nihon Emulsion Co., Ltd., Kyoeisha Chemical Co., Ltd., or the like.

The polyether-modified silicone surfactant is not particularly limited and may be suitably selected in accordance with the intended use. Examples thereof include a compound in which a polyalkylene oxide structure represented by Formula 1 is induced in Si portion side chain of dimethyl polysiloxane.

Formula 1 wherein $X=\!\!-\!\!R(C_2H_4O)_a(C_3H_6O)b_bR'$

In Formula 1, x, y, a and b are each an integer; R represents an alkyl group, and R' represents an alkylene group.

As the polyether-modified silicone surfactant/polyalkylene oxide modified silicone, commercial products may be used.

Examples of the commercial products include KF-618, KF-642 and KF-643 (produced by Shin-Etsu Chemical Co., Ltd.); EMALEX-SS-5602 and SS-1906EX (produced by Nihon Emulsion Co., Ltd.); FZ-2105, FZ-2118, FZ-2154, FZ-2161, FZ-2162, FZ-2163 and FZ-2164 (produced by TORAY Dow Corning Silicone Co., Ltd.); and BYK-33, BYK 331, BYK 341, BYK 348, BYK 349, BYK 3455, BYK-387 (produced by BYK Chemie GmbH); Tegowet 240, Tegowet 245, Tegowet 250, Tegowet 260 (produced by Evonik); Silwet L-77 (produced by Sabic), DBE 714 surfactant.

All surfactants mentioned in this section may be used solely, or they may be used in combination of the plural.

Ethoxylated acetylene glycols have a general structure as shown in Formula 2.

Formula 2

Wherein $R_1$ and $R_4$ are the same or different alkyl radicals having from 3-10, preferably from 3-6 carbon atoms, preferably $R_1$ and $R_4$ are the same and $R_2$ and $R_3$ are the same or different and selected from methyl and ethyl, preferably both $R_2$ and $R_3$ are methyl and x and y are both integers and have a sum in the range of between 1 and 60.

In an embodiment, an ethoxylated acetylene glycol according to Formula 2 is used as a surfactant alone or in combination with other surfactants in an ink composition according to the present invention, wherein x and y are independent of one another and each are in a range of between 0 and 25, preferably between 0 and 20, more preferably between 0 and 15, with the proviso that at least one of x and y is larger the 0.

Specific examples of ethoxylated acetylene glycols are ethoxylated 3-methyl-1-nonyn-3-ol, ethoxylated 7,10-dimethyl-8-hexadecyne-7,10-diol, ethoxylated 4,7-dimethyl-5-decyne-4,7-diol, ethoxylated 2,4,7,9-tetramethyl-5-decyne-4,7-diol, and ethoxylated 2,5,8,11-tetramethyl-6-dodecyne-5,8-diol. These can be used in combination with each other.

Surfactants may be used separately and in combination of the plural.

Inks

Any ink composition comprising dispersed particles that upon contact with the salt comprised in the pre-treatment liquid agglomerate. The dispersed particles may be colorant particles, in particular pigment particles and/or latex particles. Examples of suitable inks are aqueous pigmented inks and latex inks, wherein the particles present in the ink (e.g. pigment particles and/or latex particles) are sensitive to reacting with the metal salts present in the primer compositions according to the present invention. Such ink compositions are for example disclosed in the published International Patent Application WO2013/131924, in particular in the Examples and the cited prior art, which are hereby incorporated by reference.

Colorant

The colorant particles may be a pigment or a mixture of pigments, a dye or a mixture of dyes or a mixture comprising pigments and dyes, as long as the colorant is water-dispersed.

Examples of the pigment usable in the present invention include those commonly known without any limitation, and either a water-dispersed pigment or an oil-dispersed pigment is usable. For example, an organic pigment such as an insoluble pigment or a lake pigment, as well as an inorganic pigment such as carbon black, is preferably usable.

Examples of the insoluble pigments are not particularly limited, but preferred are an azo, azomethine, methine, diphenylmethane, triphenylmethane, quinacridone, anthraquinone, perylene, indigo, quinophthalone, isoindolinone, isoindoline, azine, oxazine, thiazine, dioxazine, thiazole, phthalocyanine, or diketopyrrolopyrrole dye.

For example, inorganic pigments and organic pigments for black and color inks are exemplified. These pigments may be used alone or in combination. As the inorganic pigments, it is possible to use carbon blacks produced by a known method such as a contact method, furnace method and thermal method, in addition to titanium oxide, iron oxide, calcium carbonate, barium sulfate, aluminum hydroxide, barium yellow, cadmium red and chrome yellow.

As the organic pigments, it is possible to use azo pigments (including azo lake, insoluble azo pigments, condensed pigments, chelate azo pigments and the like), polycyclic pigments (e.g., phthalocyanine pigments, perylene pigments, perynone pigments, anthraquinone pigments, quinacridone pigments, dioxazine pigments, indigo pigments, thioindigo pigments, isoindolinone pigments, and quinophthalone pigments), dye chelates (e.g., basic dye type chelates, and acidic dye type chelates), nitro pigments, nitroso pigments, aniline black. Among these, particularly, pigments having high affinity with water are preferably used.

Specific pigments which are preferably usable are listed below.

Examples of pigments for magenta or red include: C.I. Pigment Red 1, C.I. Pigment Red 2, C.I. Pigment Red 3. C.I. Pigment Red 5. C.I. Pigment Red 6, C.I. Pigment Red 7. C.I. Pigment Red 15, C.I. Pigment Red 16, C.I. Pigment Red 17, C.I. Pigment Red 22, C.I. Pigment Red 23, C.I. Pigment Red 31, C.I. Pigment Red 38, C.I. Pigment Red 48:1, C.I. Pigment Red 48:2 (Permanent Red 2B(Ca)), C.I. Pigment Red 48:3, C.I. Pigment Red 48:4, C.I. Pigment Red 49:1, C.I. Pigment Red 52:2; C.I. Pigment Red 53:1, C.I. Pigment Red 57:1 (Brilliant Carmine 6B), C.I. Pigment Red 60:1, C.I. Pigment Red 63:1, C.I. Pigment Red 64:1, C.I. Pigment Red 81. C.I. Pigment Red 83, C.I. Pigment Red 88, C.I. Pigment Red 101(colcothar), C.I. Pigment Red 104, C.I. Pigment Red 106, C.I. Pigment Red 108 (Cadmium Red), C.I. Pigment Red 112, C.I. Pigment Red 114, C.I. Pigment Red 122 (Quinacridone Magenta), C.I. Pigment Red 123, C.I. Pigment Red 139, C.I. Pigment Red 44, C.I. Pigment Red 146, C.I. Pigment Red 149, C.I. Pigment Red 166, C.I. Pigment Red 168, C.I. Pigment Red 170, C.I. Pigment Red 172, C.I. Pigment Red 177, C.I. Pigment Red 178, C.I. Pigment Red 179, C.I. Pigment Red 185, C.I. Pigment Red 190, C.I. Pigment Red 193, C.I. Pigment Red 209, C.I. Pigment Red 219 and C.I. Pigment Red 222, C.I. Pigment Violet 1 (Rhodamine Lake), C.I. Pigment Violet 3, C.I. Pigment Violet 5:1, C.I. Pigment Violet 16, C.I. Pigment Violet 19, C.I. Pigment Violet 23 and C.I. Pigment Violet 38.

Examples of pigments for orange or yellow include: C.I. Pigment Yellow 1, C.I. Pigment Yellow 3, C.I. Pigment Yellow 12, C.I. Pigment Yellow 13, C.I. Pigment Yellow 14, C.I. Pigment Yellow 15, C.I. Pigment Yellow 15:3, C.I. Pigment Yellow 17, C.I. Pigment Yellow 24, C.I. Pigment Yellow 34, C.I. Pigment Yellow 35, C.I. Pigment Yellow 37, C.I. Pigment Yellow 42 (yellow iron oxides), al, Pigment Yellow 53, C.I. Pigment Yellow 55, C.I. Pigment Yellow 74, C.I. Pigment Yellow 81, C.I. Pigment Yellow 83, C.I. Pigment Yellow 93, C.I. Pigment Yellow 94, C.I. Pigment Yellow 95, C.I. Pigment Yellow 97. C.I. Pigment Yellow 98, C.I. Pigment Yellow 100, C.I. Pigment Yellow 101, C.I. Pigment Yellow 104, C.I. Pigment Yellow 408, C.I. Pigment Yellow 109, C.I. Pigment Yellow 110, C.I. Pigment Yellow 117, C.I. Pigment Yellow 120, C.I. Pigment Yellow 128, C.I. Pigment Yellow 138, C.I. Pigment Yellow 150, C.I. Pigment Yellow 151, C.I. Pigment Yellow 153 and C.I. Pigment Yellow 183; C.I. Pigment Orange 5, C.I. Pigment Orange 13, C.I. Pigment Orange 16, C.I. Pigment Orange 17, C.I. Pigment Orange 31, C.I. Pigment Orange 34, C.I. Pigment Orange 36, C.I. Pigment Orange 43, and C.I. Pigment Orange 51.

Examples of pigments for green or cyan include: C.I. Pigment Blue 1, C.I. Pigment Blue 2, C.I. Pigment Blue 15, C.I. Pigment Blue 15:1. C.I. Pigment Blue 15:2, C.I. Pigment Blue 15:3 (Phthalocyanine Blue), C.I. Pigment Blue 16, C.I. Pigment Blue 17:1, C.I. Pigment Blue 56, C.I. Pigment Blue 60, C.I. Pigment Blue 63, C.I. Pigment Green 1, C.I. Pigment Green 4, C.I. Pigment Green 7, C.I. Pigment Green 8, C.I. Pigment Green 10, C.I. Pigment Green 17, C.I. Pigment Green 18 and C.I. Pigment Green 36.

In addition to the above pigments, when red, green, blue or intermediate colors are required, it is preferable that the following pigments are employed individually or in combination thereof. Examples of employable pigments include: al. Pigment Red 209, 224, 177, and 194, C.I. Pigment Orange 43, al. Vat Violet 3. al. Pigment Violet 19, 23, and 37, C.I. Pigment Green 36, and 7, C.I. Pigment Blue 15:6.

Further, examples of pigments for black include: C.I. Pigment Black 1, C.I. Pigment Black 6, C.I. Pigment Black 7 and C.I. Pigment Black 11. Specific examples of pigments for black color ink usable in the present invention include carbon blacks (e.g., furnace black, lamp black, acetylene black, and channel black); (C.I. Pigment Black 7) or metal-based pigments (e.g., copper, iron (C.I. Pigment Black 11), and titanium oxide; and organic pigments (e.g., aniline black (C.I. Pigment Black 1).

The amount of the water-insoluble pigment contained in the inkjet ink, as a solid content, is preferably 0.5 weight % to 15 weight %, more preferably 0.8 weight % to 10 weight %, and even more preferably between 1 weight % and 6 weight %. When the amount of the water-insoluble pigment is less than 0.5 weight %, the color developing ability and image density of the ink may degrade. When it is more than 15 weight %, unfavorably, the viscosity of the ink is increased, causing a degradation in ink ejection stability.

Latex Particles

The inkjet ink present in an ink set according to the present invention may contain a water-dispersed resin (latex resin) in view of the pigment fixability to recording media. As the water-dispersed resin, a water-dispersed resin excellent in film formability (image formability) and having high water repellency, high waterfastness, and high weatherability is useful in recording images having high waterfastness and high image density (high color developing ability).

Examples of the water-dispersed resin include synthetic resins and natural polymer compounds.

Examples of the synthetic resins include polyester resins, polyurethane resins, polyepoxy resins, polyimide resins, polyether resins, poly(meth)acrylic resins, acryl-silicone resins, fluorine-based resins, polyolefin resins, polystyrene-based resins, polybutadiene-based resins, polyvinyl acetate-based resins, polyvinyl alcohol-based resins, polyvinyl ester-based resins, polyvinyl chloride-based resins, polyacrylic acid-based resins, unsaturated carboxylic acid-based resins and copolymers such as styrene-acrylate copolymer resins, styrene-butadiene copolymer resins.

Examples of the natural polymer compounds include celluloses, rosins, and natural rubbers.

In an embodiment, the water dispersed resin used in the present invention may be made of a resin having a water soluble functional group such as a carboxylic group or a sulfonic group.

In an embodiment, the ink composition according to the present invention comprises a resin having a carboxylic group which has a small dissociation rate from the viewpoint of producing high speed aggregation effect of the water-dispersed resin. Since a carboxylic acid group tends to be influenced by a pH change, a dispersion state changes easily and its aggregation property is high. Examples of resins suitable for use in ink compositions according to the present embodiment are: an acrylic resin, a vinyl acetate resin, a styrene butadiene resin, a vinyl chloride resin, an acrylic styrene resin, a butadiene resin and styrene resin. As for the resin component of the water-dispersed resin, it is preferable that it is a polymer having both a hydrophilic portion and a hydrophobic part in the molecule. By having a hydrophobic part, it is possible that a hydrophobic part will be orientated to the inside of the water-dispersed resin, and a hydrophilic portion will be effectively orientated to the outside of the water-dispersed resin. As a result, the change of a dispersion state in response to the pH change of a liquid will become larger, and aggregation of the ink will be performed more efficiently.

Examples of commercially available water-dispersed resin emulsions include: Joncryl 537 and 7640 (styrene-acrylic resin emulsion, made by Johnson Polymer Co., Ltd.), Microgel E-1002 and E-5002 (styrene-acrylic resin emulsion, made by Nippon Paint Co., Ltd.), Voncoat 4001 (acrylic resin emulsion, made by Dainippon Ink and Chemicals Co., Ltd.), Voncoat 5454 (styrene-acrylic resin emulsion, made by Dainippon Ink and Chemicals Co., Ltd.), SAE-1014 (styrene-acrylic resin emulsion, made by Zeon Japan Co., Ltd.), Jurymer ET-410 (acrylic resin emulsion, made by Nihon Junyaku Co., Ltd.), Aron HD-5 and A-104 (acrylic resin emulsion, made by Toa Gosei Co., Ltd.), Saibinol SK-200 (acrylic resin emulsion, made by Saiden Chemical Industry Co., Ltd.), and Zaikthene L (acrylic resin emulsion, made by Sumitomo Seika Chemicals Co., Ltd.), acrylic copolymer emulsions of DSM Neoresins, e.g. the NeoCryl product line, in particular acrylic styrene copolymer emulsions NeoCryl A-662, NeoCryl A-633, NeoCryl A-1131, NeoCryl A-2091, NeoCryl A-550, NeoCryl BT-101, NeoCryl SR-270, NeoCryl XK-52, NeoCryl XK-39, NeoCryl XK-205 NeoCryl A-1044, NeoCryl A-1049, NeoCryl A-1110, NeoCryl A-1120, NeoCryl A-1127, NeoCryl A-2092, NeoCryl A-2099, NeoCryl A-308, NeoCryl A-45, NeoCryl A-615, NeoCryl BT-24, NeoCryl BT-26, NeoCryl BT-36, NeoCryl XK-15, NeoCryl X-151, NeoCryl XK-232, NeoCryl XK-234, NeoCryl XK-237, NeoCryl XK-238-NeoCryl XK-86, NeoCryl XK-90 and NeoCryl XK-95 However, the water-dispersed resin emulsion is not limited to these examples.

As the fluorine-based resin, fluorine-based resin fine particles having a fluoroolefin unit are preferred. Of these, fluorine-containing resin fine particles containing a fluoroolefin unit and a vinylether unit are particularly preferable. The fluoroolefin unit is not particularly limited and may be suitably selected in accordance with the intended use. Examples thereof include —$CF_2CF_2$—, —$CF_2CF(CF_3)$—, and —$CF_2CFCl$—.

The vinylether unit is not particularly limited and may be suitably selected in accordance with the intended use. Examples thereof include —$C(R_a)HC(OR_b)$—; wherein $R_a$ is a hydrogen atom or a methyl group; and wherein $R_b$ may be selected from the group consisting of —$CH_2R_c$, —$C_2H_4R_c$, —$C_3H_c$, —$C_4H_8R_c$, and —$C_5H_{10}R_c$, wherein $R_c$ is selected from the group consisting of a hydrogen atom (—H), an hydroxy group (—OH) or a carboxylic acid group (—COOH)

As the fluorine-containing vinylether-based resin fine particles containing a fluoroolefin unit and a vinylether unit, an alternated copolymer, in which the fluoroolefin unit and the vinylether unit are alternately copolymerized, is preferable. As such a fluorine-based resin fine particles, a suitably synthesized compound may be used and a commercially available product may be used. Examples of the commercially available products include FLUONATE FEM-500 and FEM-600, DICGUARD F-52S, F-90, F-90M, F-90N and AQUAFURFURAN TE-5A produced by Dainippon Ink Chemical Industries Co., Ltd, LUMIFLON FE4300, FE4500, FE4400, ASAHI GUARD AG-7105, AG-950, AG-7600, AG-7000, and AG-1100 produced by Asahi Glass Co., Ltd.

The water-dispersed resin may be used in the form of a homopolymer, a copolymer or a composite resin, and all of water-dispersed resins having a monophase structure or core-shell structure and those prepared by power-feed emulsion polymerization may be used. As the water-dispersed resin, it is possible to use a resin which in itself has a hydrophilic group and hence has a certain degree of self-dispersibility, and a resin which in itself has no dispersibility but to which the dispersibility is imparted with use of a surfactant and/or another resin having a hydrophilic group. Among these resins, an emulsion of a resin obtained by emulsion polymerization or suspension polymerization of an ionomer of a polyester resin or a polyurethane resin is most suitably used. In the case of emulsion polymerization of an unsaturated monomer, a resin dispersion is obtained by initiating a polymerization reaction in the dispersed monomer phase in the monomer in water emulsion. A polymerization initiator, a surfactant, a chain transfer agent, a chelating agent and a pH adjustor may be added to the monomer in water emulsion. Thus, a water-dispersed can be easily obtained, and the desired properties are easily obtained because the resin components can be varied.

The content of the water-dispersed resin added in the ink of the present invention is preferably from 1-40 weight % based on the total weight of the ink, and it is more preferably from 1.5-30 weight %, and it is still more preferably from 2-25 weight %. Even more preferably, the amount of the water-dispersed resin contained in the inkjet ink, as a solid content, is 2.5 weight % to 15 weight %, and more preferably 3 weight % to 7 weight %, relative to the total ink composition.

Inks may comprise additives such as co-solvents and surfactants which are not limited to any kind and may be similar to the co-solvents and surfactants used in pre-treatment liquids according to the present invention as described above.

An ink set according to the present invention comprises a pre-treatment liquid according to the present invention and an ink composition as described above.

EXAMPLES

Materials

Multiwet SU was obtained from Croda, Latex dispersion NeocrylXK205 was obtained from DSM Neoresin, pigment dispersion; and COJ450 C was obtained from Cabot. All other materials were obtained from Sigma Aldrich. All materials were used as received.

Examples 1-8

Preparation of a Pre-Treatment Liquid in Accordance with the Present Invention.

A pre-treatment liquid was prepared by adding 30 grams of Magnesium-disulfamate (prepared by mixing 23.3 wt % sulfamic acid and 7 wt % $Mg(OH)_2$ with the addition of balance water to 100 wt %), 30 grams of a solid co-solvent (see Table 2), 1 gram of additives (e.g. pH-modifier and surfactant) to obtain 100 grams of a pre-treatment liquid as shown in Table 1.

TABLE 1

| pre-treatment liquid composition according to the present invention | |
|---|---|
| Component | Amount (wt %) |
| Magnesium-disulfamate | 30 |
| Solid co-solvent in accordance with Table 2 | 30 |

TABLE 1-continued pre-treatment liquid composition according to the present invention

| Component | Amount (wt %) |
|---|---|
| Additives | 1 |
| demineralized water | balance |

TABLE 2 used solid co-solvents in the present examples

| Example | Solid co-solvent | FIG. |
|---|---|---|
| 1 | no co-solvent | 1A |
| 2 | β-alanine | 1B |
| 3 | Betaine (trimethylglycine) | 1C |
| 4 | Xylitol | 1D |
| 5 | Isosorbide | 1E |
| 6 | dimethyl urea (DMU) | 1F |
| 7 | γ-amino butyric acid | 1G |
| 8 | sorbitol | 1H |

Examples 9-16

Evaporation Experiments of Pre-Treatment Liquids According to Examples 1-8 Respectively and a Reference Pre-Treatment Liquid Without any Solid Co-Solvent (but Including Magnesium-Sulfamate).

5 grams of the pre-treatment liquid was added in a disposable aluminum tray and left to dry at room temperature and 30% relative humidity for a week. Visual inspection of the results revealed that none of the pre-treatment liquids of the present examples showed any crystallization upon drying (see FIGS. 1A-H and Table 2). It is therefore concluded that with magnesium-disulfamate crystal-free pre-treatment liquid recipes can be obtained, even including a high concentration of a solid co-solvent. These pre-treatment liquid show good jetting behavior. As a reference a solution of 27.1 wt % $MgSO_4$ is subjected to a similar evaporation experiment. The result is shown in FIG. 11. It can clearly be seen that crystallization has occurred.

Example 17

Preparation of an Ink Composition for Use in Printing Experiments 18-23

An ink was prepared by adding the components as shown in Table 3 (preferably in the order of appearance in Table 1 with intermediate stirring) to obtain the composition as shown in Table 3.

TABLE 3

Ink composition for use in printing experiments

| Component | remark | amount (wt %) |
|---|---|---|
| water | balance | 66.55 |
| KOH | pH adjuster | 0.02 |
| Glycerol | co-solvent | 15.00 |
| ethoxylated acetylenic diol | surfactant | 1.00 |
| BIT | biocide | 0.03 |
| Neocryl XK205 | latex dispersion | 14.00 |
| Cabot CO 450 C | pigment dispersion | 3.40 |

Examples 18-20

Printing Experiments

All printing experiments were performed with a print set up comprising 600 DPI Kyocera KAB print heads. Both the pre-treatment liquids and the ink were jetted in this way. The print substrate used was Soporset premium offset obtained from Igepa Three print experiments were performed, each in twofold. Firstly, simplex (one sided) prints were made by applying 8.5 gr/m² of the ink composition prepared In Example 7 to the above indicated print substrate, so without applying pre-treatment liquid (Example 18, FIGS. 2A and 3A). Secondly, simplex prints were made by applying 2 gr/m² of a commercially available pre-treatment liquid: ColorGrip, a pre-treatment liquid comprising $MgNO_3$ as a crashing agent and betaine (trimethylglycine) as a co-solvent (Canon Production Printing) and subsequently applying 8.5 gr/m² of the ink composition prepared in Example 17 (Example 19, FIGS. 2B and 3B). Thirdly, Example 17 was repeated with the pre-treatment liquids as prepared in Example 3(Examples 20, FIGS. 2C and 3C). The prints were dried and fixated with the aid of IR radiation (drying and fixation in a single step). The printed sheets were exposed to IR radiation for 5 seconds. The drying and fixation temperature was approximately 90° C.

Two sheets were cut from each print experiment, such that two full bleed prints per experiment were obtained (no unprinted paper remaining that surrounds the printed area). Paper curl was followed as a function of time.

Figure 1:
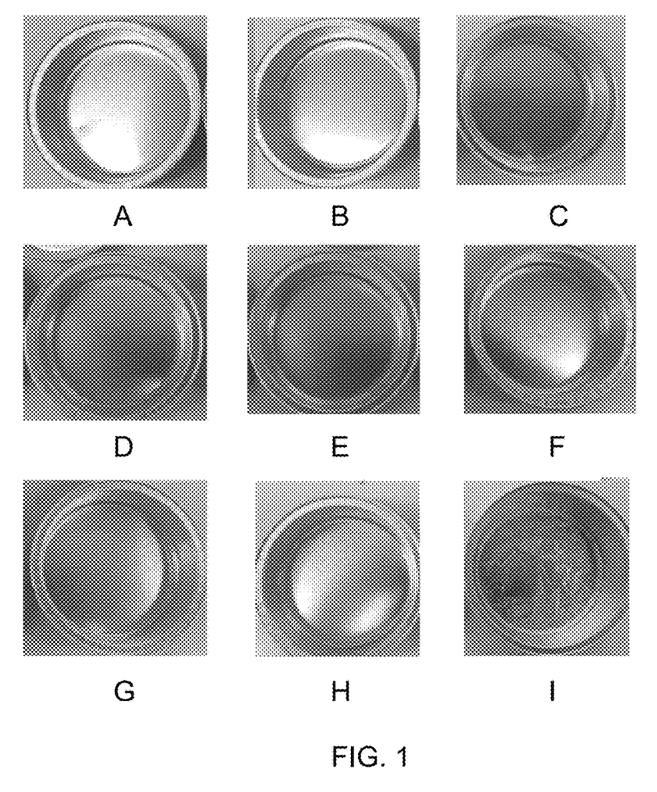
FIG. 1 Results of evaporation experiments of pre-treatment compositions comprising magnesium-disulfamate and: A) no co-solvent; B) β-alanine; C) Betaine (trimethylglycine); D) Xylitol; E) Isosorbide; F) dimethyl urea (DMU); G) γ-amino butyric acid; H) sorbitol; and I) a reference sample comprising only $MgSO_4$.
Figure 2:
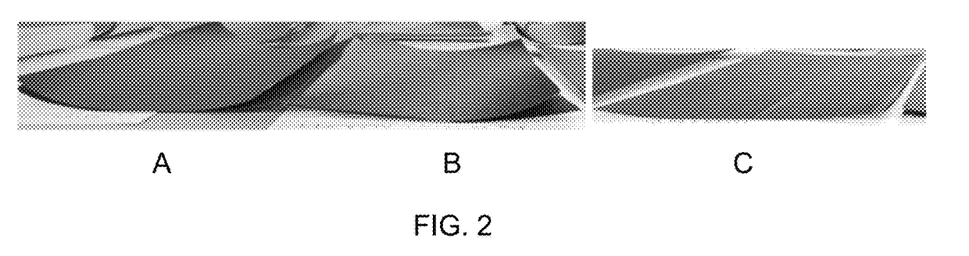
FIG. 2 Results of printing examples, showing curl after 1 week after printing: A) no pre-treatment liquid used; B) commercially available pre-treatment liquid: ColorGrip (Canon Production Printing); C) pre-treatment liquids as prepared in Example 2.
Figure 3:
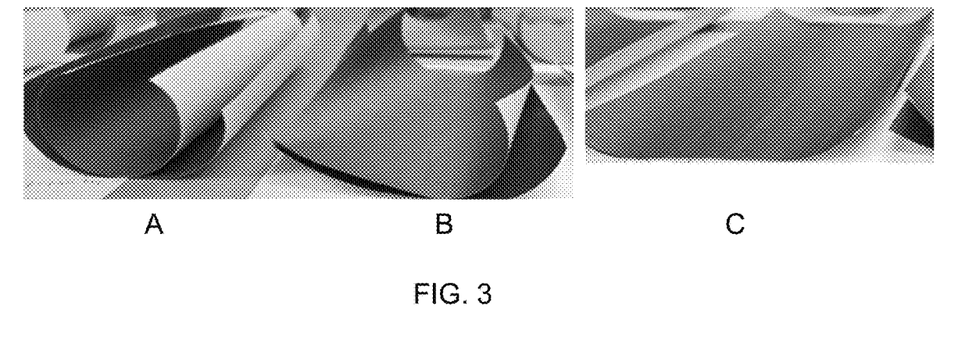
FIG. 3 Results of printing examples, showing curl after 1 month after printing: A) no pre-treatment liquid used; B) commercially available pre-treatment liquid: ColorGrip (Canon Production Printing); C) pre-treatment liquids as prepared in Example 2.

The pictures in FIG. 2 show the curl 1 week after printing. FIG. 3 shows the curl 1 month after printing. Using no pre-treatment liquid and a commercially available reference pre-treatment liquid show significant curl (FIGS. 2A, 2B, 3A and 3B). It can clearly be seen that a pre-treatment liquid in accordance with the present invention significantly reduces (inward) curl.

Example 21

Determination of Color Shift (Light Fastness) of Blank Paper and Yellowing

The color shift (also known as light fastness) and expressed as Δ2000 of samples of print substrate Soporset premium offset obtained from Igepa (with and without pre-treatment applied thereto) is determined in accordance with ASTM D3424-11, method 3, using a Xrite lab measurement instrument. The samples were irradiated with a Xenon light source at a wavelength of 420 nm at a temperature of 63° C. The measurements were performed directly after sample preparation and repeated after 3 days. All measurement were performed in 3-fold. ΔE2000 (color shift) was determined and is a direct measure for yellowing. The measurement results are shown in Table 4. The used salt concentrations in these tests were 1.1 mol/kg for all used salts. Table 4 shows that a pre-treatment liquid comprising 28.2 wt % magnesium-nitrate ($Mg(NO_3)_2 \cdot 6H_2O$) shows significant color shift with reference to blank paper, while a 27.1 wt % magnesium-sulfate ($MgSO_4 \cdot 7H_2O$) comprising pre-treatment liquid shows a much lower color shift and therefore has an improved 'yellowing' performance, i.e. less pronounced yellowing effect. The same holds for a 30.3 wt % magnesium-disulfamate ($Mg(SO_3NH_2)_2$ comprising pre-treatment liquid, which shows similar yellowing behavior than the magnesium-sulfate comprising primer.

TABLE 4

Results of color shift (light fastness) measurements

| measurement | average of three measurements | Blank paper | $Mg(NO_3)_2$ | $MgSO_4$ | $Mg(SO_3NH_2)_2$ |
|---|---|---|---|---|---|
| Initial | L | 93.9 | 92.2 | 94.4 | 94.0 |
| | a* | 3.8 | 3.2 | 3.6 | 3.5 |
| | b* | −16.3 | −14.4 | −14.3 | −15.3 |
| after 3 days | L | 93.6 | 89.9 | 93.6 | 94.0 |
| | a* | 2.3 | 2.4 | 1 | 1.3 |
| | b* | −6.5 | 19.7 | 0.7 | −0.2 |
| ΔE2000 | | 6.6 | 25.6 | 11.6 | 11.4 |

Therefore, the pre-treatment liquid in accordance with the present invention is non-yellowing and due to the selection of the crashing agent, being Magnesium-sulfamate, which is non-crystallizing, even when combined with a solid co-solvent. Such solvent can provide a significant reduction of (inward) curl.

The invention claimed is:

1. An aqueous pre-treatment liquid for use in ink jet printing, the pre-treatment liquid comprising:
   water; and
   magnesium disulphamate; and
   a solid co-solvent, wherein the solid co-solvent is selected from the group consisting of: β-alanine, xylitol, isosorbide, γ-amino butyric acid and sorbitol.

2. The aqueous pre-treatment liquid of claim 1, wherein the magnesium disulphamate is present in a concentration of above 10 wt %, relative to the total pre-treatment liquid composition.

3. The aqueous pre-treatment liquid according to claim 1, wherein the co-solvent is present in an amount of above 10 wt %, relative to the total pre-treatment liquid composition.

4. The aqueous pre-treatment liquid according to claim 1, wherein the co-solvent is present in an amount of above 10 wt %, relative to the total pre-treatment liquid composition.

5. The aqueous pre-treatment liquid of claim 1, wherein the aqueous pre-treatment liquid is configured to pre-treat a recording substrate by being applied onto the recording substrate in ink jet printing and to contact with an ink composition.

* * * * *